United States Patent
DeVincentis et al.

(10) Patent No.: US 7,638,951 B2
(45) Date of Patent: Dec. 29, 2009

(54) PLASMA LAMP WITH STABLE FEEDBACK AMPLIFICATION AND METHOD THEREFOR

(75) Inventors: Marc DeVincentis, Palo Alto, CA (US); Frederick M. Espiau, Topanga, CA (US); Yian Chang, Topanga, CA (US)

(73) Assignee: Luxim Corporation, Sunnyvale, CA (US)

( * ) Notice: Subject to any disclaimer, the term of this patent is extended or adjusted under 35 U.S.C. 154(b) by 495 days.

(21) Appl. No.: 11/553,881

(22) Filed: Oct. 27, 2006

(65) Prior Publication Data

US 2007/0252532 A1    Nov. 1, 2007

Related U.S. Application Data

(60) Provisional application No. 60/730,720, filed on Oct. 27, 2005, provisional application No. 60/730,654, filed on Oct. 27, 2005, provisional application No. 60/730,785, filed on Oct. 27, 2005, provisional application No. 60/730,950, filed on Oct. 27, 2005, provisional application No. 60/730,953, filed on Oct. 27, 2005, provisional application No. 60/730,786, filed on Oct. 27, 2005.

(51) Int. Cl.
H05B 41/16    (2006.01)

(52) U.S. Cl. .......................... 315/248; 315/39; 315/291; 313/634; 313/636

(58) Field of Classification Search ................ 315/39, 315/248, 291; 313/113, 153, 634, 636
See application file for complete search history.

(56) References Cited

U.S. PATENT DOCUMENTS

| | | | |
|---|---|---|---|
| 3,787,705 A | 1/1974 | Bolin et al. | |
| 3,826,950 A | 7/1974 | Hruda et al. | |
| 4,001,631 A | 1/1977 | McNeill et al. | |
| 4,206,387 A | 6/1980 | Kramer et al. | |
| 4,485,332 A | 11/1984 | Ury et al. | |

(Continued)

FOREIGN PATENT DOCUMENTS

JP    8148127    6/1996

(Continued)

OTHER PUBLICATIONS

"Chapter 4—Cavity Resonators, Army Technical Manual, TM 11-673—Generation and Transmission of Microwave Energy", (Jun. 1953), 12 pgs.

(Continued)

*Primary Examiner*—David Hung Vu
*Assistant Examiner*—Tung X Le
(74) *Attorney, Agent, or Firm*—Schwegman, Lundberg & Woessner P.A.

(57) ABSTRACT

A plasma lamp with a positive-loop feedback topology, having a resonating waveguide body and at least one amplifier critically coupled to the body which is stable under all operating conditions both before a plasma is formed and after the plasma reaches steady state. An iterative method for configuring the lamp circuit includes determining the load trajectory of each amplifier under all operating conditions, and overlaying it on a polar-plot showing regions of stability, conditional stability, and instability. If the load trajectory passes through an unstable region, circuit alterations are made to avoid that region.

25 Claims, 12 Drawing Sheets

U.S. PATENT DOCUMENTS

| | | | |
|---|---|---|---|
| 4,498,029 A | 2/1985 | Yoshizawa et al. | |
| 4,633,140 A | 12/1986 | Lynch et al. | |
| 4,749,915 A | 6/1988 | Lynch et al. | |
| 4,795,658 A | 1/1989 | Kano et al. | |
| 4,887,192 A | 12/1989 | Simpson et al. | |
| 4,950,059 A | 8/1990 | Roberts | |
| 4,975,625 A | 12/1990 | Lynch et al. | |
| 4,978,891 A | 12/1990 | Ury | |
| 5,039,903 A | 8/1991 | Farrall | |
| 5,070,277 A | 12/1991 | Lapatovich | |
| 5,072,157 A | 12/1991 | Greb et al. | |
| 5,086,258 A | 2/1992 | Mucklejohn et al. | |
| 5,349,271 A * | 9/1994 | van Os et al. | 315/248 |
| 5,361,274 A | 11/1994 | Simpson et al. | |
| 5,373,217 A | 12/1994 | Gregor | |
| 5,438,242 A | 8/1995 | Simpson | |
| 5,448,135 A | 9/1995 | Simpson | |
| 5,498,937 A | 3/1996 | Korber et al. | |
| 5,525,865 A | 6/1996 | Simpson | |
| 5,594,303 A | 1/1997 | Simpson et al. | |
| 5,786,667 A | 7/1998 | Simpson et al. | |
| 5,811,940 A | 9/1998 | Nutzel | |
| 5,910,710 A | 6/1999 | Simpson | |
| 5,910,754 A | 6/1999 | Simpson et al. | |
| 5,923,116 A | 7/1999 | Mercer et al. | |
| 6,020,800 A | 2/2000 | Arakawa et al. | |
| 6,031,333 A | 2/2000 | Simpson | |
| 6,049,170 A | 4/2000 | Hochi et al. | |
| 6,137,237 A * | 10/2000 | MacLennan et al. | 315/248 |
| 6,246,160 B1 | 6/2001 | MacLennan et al. | |
| 6,252,346 B1 | 6/2001 | Turner et al. | |
| 6,265,813 B1 | 7/2001 | Knox et al. | |
| 6,313,587 B1 | 11/2001 | MacLennan et al. | |
| 6,424,099 B1 | 7/2002 | Kirkpatrick et al. | |
| 6,566,817 B2 | 5/2003 | Lapatovich | |
| 6,617,806 B2 * | 9/2003 | Kirkpatrick et al. | 315/248 |
| 6,666,739 B2 | 12/2003 | Pothoven et al. | |
| 6,737,809 B2 | 5/2004 | Espiau et al. | |
| 6,856,092 B2 | 2/2005 | Pothoven et al. | |
| 6,922,021 B2 | 7/2005 | Espiau et al. | |
| 7,034,464 B1 * | 4/2006 | Izadian et al. | 315/39 |
| 7,291,985 B2 | 11/2007 | Espiau et al. | |
| 7,348,732 B2 | 3/2008 | Espiau et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,429,818 B2 | 9/2008 | Chang et al. | |
| 2001/0035720 A1 | 11/2001 | Guthrie et al. | |
| 2002/0047615 A1* | 4/2002 | Yokozeki et al. | 315/248 |
| 2002/0105274 A1* | 8/2002 | Pothoven et al. | 313/634 |
| 2005/0212456 A1 | 9/2005 | Espiau et al. | |
| 2005/0286263 A1 | 12/2005 | Champion et al. | |
| 2006/0250090 A9 | 11/2006 | Guthrie et al. | |
| 2007/0109069 A1 | 5/2007 | Espiau et al. | |
| 2008/0211971 A1 | 9/2008 | Pradhan | |

FOREIGN PATENT DOCUMENTS

| | | |
|---|---|---|
| KR | 1020050018587 A | 2/2005 |
| WO | WO-2006070190 | 7/2006 |
| WO | WO-2007050889 A2 | 5/2007 |
| WO | WO-2007050889 A3 | 5/2007 |
| WO | WO-2007138276 | 12/2007 |
| WO | WO-2006129102 | 12/2008 |

OTHER PUBLICATIONS

"Chapter 6.3—Rectangular Waveguide Cavities", in: *Microwave Engineering*, Pozar, D. M., Editor (John Wiley & Sons, Inc.), (Jul. 1997), pp. 313-318.

"International Application Serial No. PCT/US2006/042000, Search Report", 1 pg.

"International Application Serial No. PCT/US2006/042000, Written Opinion", 4 pgs.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", *Guthrie Exhibit 2173, Board of Patent Appeals and Interferences* (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, and Don Wilson, 16 pgs.

Guthrie, Charles, "Lamp", U.S. Appl. No. 60/687,458, filed Jun. 6, 2005, 12 pgs.

Guthrie, Charles, et al., "Lamp", U.S. Appl. No. 60/687,280, filed Jun. 3, 2005, and Neate, 17 pgs.

Inventors Not Listed, "Lamp", International Application Serial No. PCT GB2007 001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: *Microwave Engineering, 3rd Edition*, 2005 (John Wiley & Sons, Inc.), (2005), 9 pgs.

Pozar, D. M., "Section 6.4, Circular Waveguide Cavities", in: *Microwave Engineering, 3rd Edition*, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: *Lamps & Lighting, 4th Edition*, 1997 (Arnold & John Wiley & Sons, Inc., (1997), 13 pgs.

Wharmby, D. O., "Electrodeless Lamps for Lighting: A Review", *IEEE Proceedings-A*, vol. 140 (6), (Nov. 1993), 9 pgs.

Wilson, D., et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

\* cited by examiner

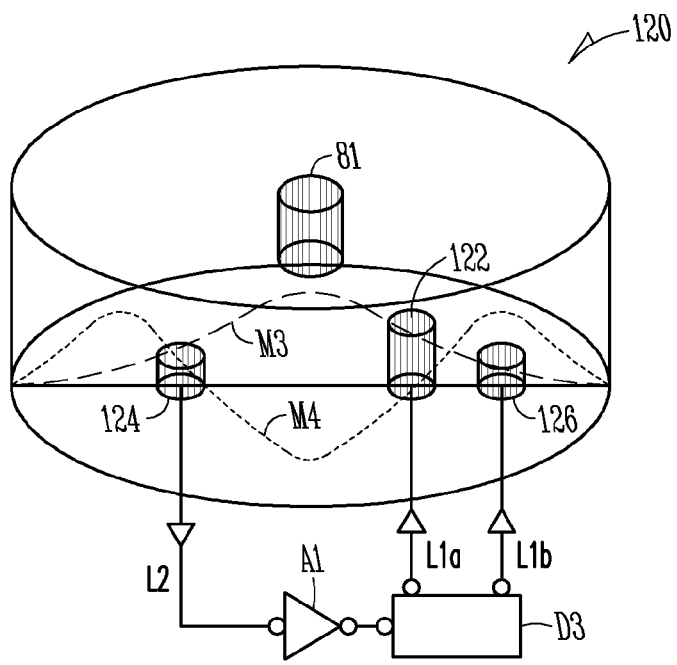
FIG. 9A
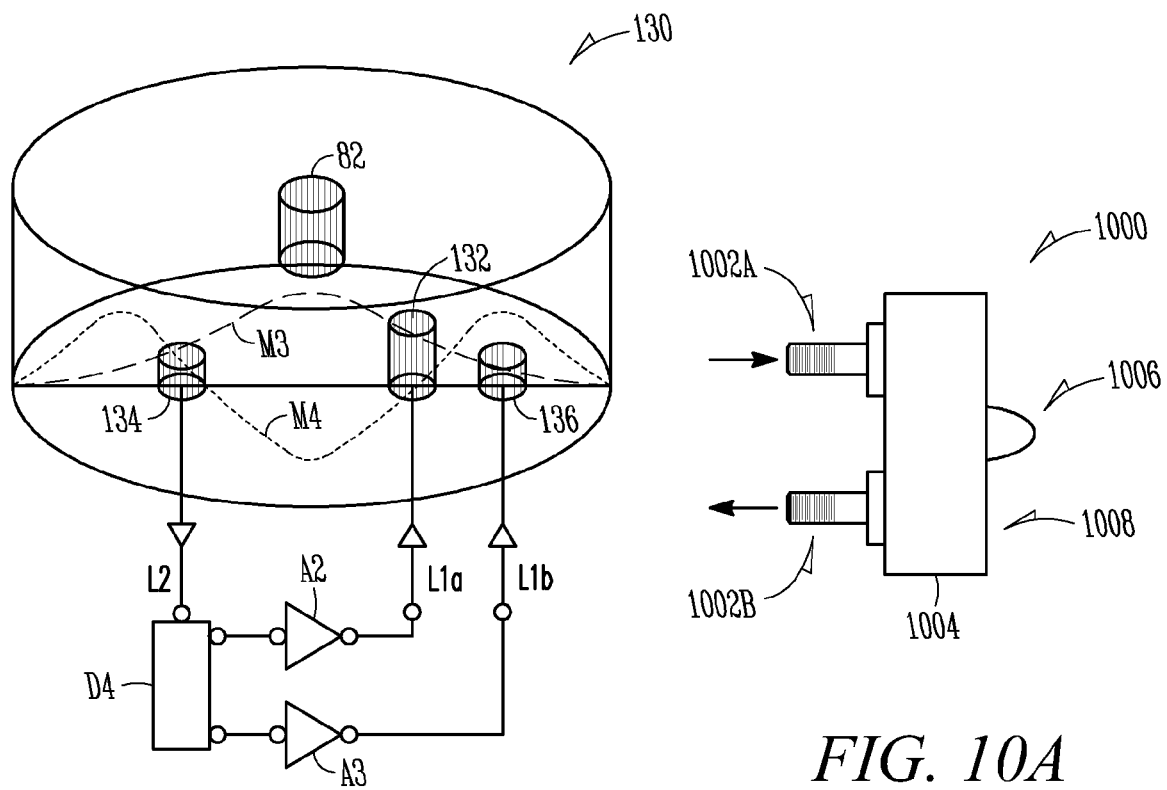
FIG. 10A
FIG. 9B

# PLASMA LAMP WITH STABLE FEEDBACK AMPLIFICATION AND METHOD THEREFOR

CROSS-REFERENCE

This application claims benefit of priority to U.S. Provisional Application Ser. No. 60/730,720 filed on Oct. 27, 2005, U.S. Provisional Application Ser. No. 60/730,654 filed on Oct. 27, 2005, U.S. Provisional Application Ser. No. 60/730,785 filed on Oct. 27, 2005, U.S. Provisional Application Ser. No. 60/730,950 filed on Oct. 27, 2005, U.S. Provisional Application Ser. No. 60/730,953 filed on Oct. 27, 2005 and U.S. Provisional Application Ser. No. 60/730,786 filed on Oct. 27, 2005, the entire contents of which are herein incorporated by reference.

BACKGROUND

1. Field

The field of the present invention relates to systems and methods for generating light, and more particularly to electrodeless plasma lamps.

2. Background

Electrodeless plasma lamps may be used to provide point-like, bright, white light sources. Because electrodes are not used, they may have longer useful lifetimes than other lamps. Some plasma lamps direct microwave energy into an air cavity, with the air cavity enclosing a bulb containing a mixture of substances that can ignite, form a plasma, and emit light. However, for many applications, light sources that are brighter, smaller, less expensive, more reliable, and have longer useful lifetimes are desired.

Some plasma lamps use a solid dielectric waveguide body. An amplifier may be used to provide power to the waveguide body at a frequency causing it to resonate. A positive-feedback loop may be used to maintain resonance during operation of the lamp. Feedback obviates the need for precise prediction and implementation of the resonant frequency, enabling manufacturing tolerances on the body to be relaxed. Moreover, feedback maintains coupling across resonant frequency changes associated with large temperature swings. Instead of requiring a precisely tuned microwave source at a predicted, preselected operating frequency, an amplifier with a feedback loop can be used to adjust to changing lamp conditions during operation.

What is desired are improved systems and methods for providing power to, and obtaining feedback from, a plasma lamp to maintain a resonant condition. What is also desired are systems and methods for stable operation of a plasma lamp using amplifiers that have unstable regions of operation.

SUMMARY

An example embodiment provides a plasma lamp including a waveguide body of dielectric material having a dielectric constant greater than about 2, a plasma bulb adjacent to the body, first and second probes positioned within the body, and an amplifier coupled to the first and second probes. The amplifier includes an unstable region of operation. A phase exists where the load trajectory would cross the unstable region of the amplifier. The lamp further includes means for ensuring amplifier stability under all operating conditions. For example, the transmission lines may be selected to provide for stable operation or phase shifting may be used to provide for stable operation.

In an example embodiment, the lamp may include means for critically coupling the amplifier to the first probe after the plasma reaches steady state. For example, phase shifting may be used to critically couple the amplifier to the first probe after the plasma reaches steady state.

In a further example embodiment, a method of generating light is provided. A lamp body and a bulb have a load trajectory from start-up to steady state operation. Power is coupled to the lamp body from an amplifier using feedback from the lamp body. A phase exists such that the load trajectory would cross the unstable region of operation. The phase of the feedback is adjusted such that the load trajectory does not cross the unstable region of the amplifier.

In another example embodiment, a method is provided for configuring a plasma lamp, powered by an amplifier, with a positive-loop feedback topology such that the amplifier remains stable and the loop resonant for all operating conditions. The method may include, for all load conditions, measuring at an amplifier input the magnitude and phase of the outgoing and reflected electric fields; for each load condition, determining a load trajectory by plotting the field-ratio on a complex plane; identifying regions on the complex plane where the amplifier is stable and unstable; and overlaying the regions on the load trajectory to predict circuit behavior. The circuit design may then be selected to operate within the stable regions by selecting transmission lines that will cause operation in the stable regions or by using phase shifting to operate the lamp in the stable regions.

A more complete understanding of the present invention and other aspects and advantages thereof will be gained from a consideration of the following description of example embodiments read in conjunction with the accompanying drawing figures provided herein. In the figures and description, numerals indicate the various features of example embodiments, like numerals referring to like features throughout both the drawings and description.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of example embodiments will be obtained by reference to the following detailed description, in which:

FIG. 9A schematically depicts an example plasma lamp having a cylindrical body and a drive probe, feedback probe, and start probe. The feedback probe is connected to the drive probe and start probe by an amplifier and a diplexer.

FIG. 9B schematically depicts an example plasma lamp having a cylindrical body and a drive probe, feedback probe, and start probe. The feedback probe is connected to the drive probe by a diplexer and a first amplifier, and to the start probe by the diplexer and a second amplifier.

FIG. 10A is a side view of a lamp according to an example embodiment with a connector to a drive probe and a connector to a feedback probe according to an example embodiment.

DETAILED DESCRIPTION

Figure 1:
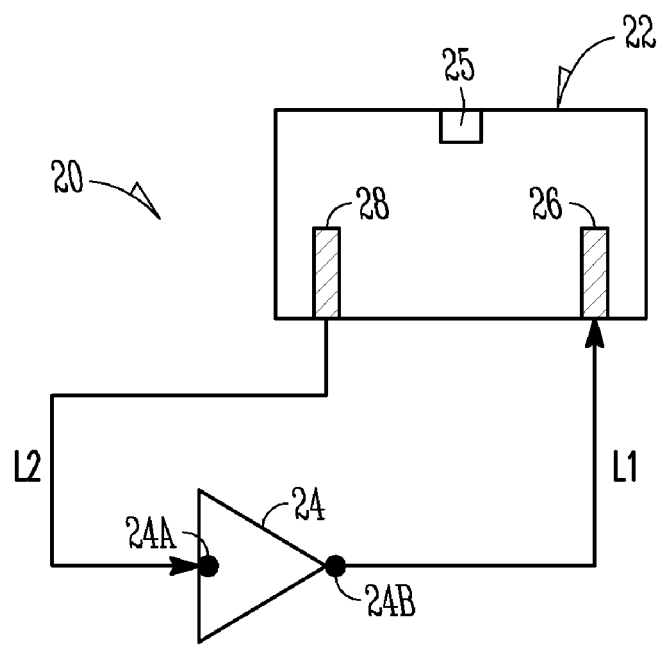
FIG. 1 schematically depicts a cross-sectional view of a plasma lamp using an amplifier with an unstable region of operation according to an example embodiment.

While the present invention is open to various modifications and alternative constructions, the example embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

As shown in FIG. 1, an example embodiment provides a plasma lamp 20 with a waveguide body 22 comprising a dielectric material. In an example embodiment, the waveguide body 22 may have a dielectric constant greater than 2. For example, the body 22 may be solid and comprise alumina or other dielectric material. A power source, such as an amplifier 24, may be coupled to the waveguide body 22 to provide power to the waveguide at a frequency in the range of 50 MHz to 30 GHz or any range subsumed therein. The amplifier 24 may be coupled to a drive probe 26 to provide power to the waveguide body 22. The drive probe 26 may be inserted into an opening formed in the waveguide body and may be in direct contact with the waveguide body 22 to effectively couple power into the waveguide body. A feedback probe 28 may be coupled to the waveguide body 22 and the amplifier 24 to obtain feedback from the waveguide body 22 and provide it to the amplifier 24. The feedback probe 28 may be inserted into an opening formed in the waveguide body 22 and may be in direct contact with the waveguide body 22 to effectively obtain feedback from the waveguide body 22. A bulb 25 may be positioned to receive power from the waveguide body 22. The bulb 25 may contain a gas-fill that forms a plasma and emits light when power is provided from the waveguide body 22 to the bulb 25. In some embodiments, the bulb 25 may be positioned in an opening formed in the waveguide body 22.

In the example embodiment of FIG. 1, the waveguide body 22 is configured to resonate when power is provided by the amplifier 24 to the drive probe 26 at a particular frequency. However, the ignition of the plasma in the bulb 25 and heating of the bulb 25 and the waveguide body 22 may cause resonant conditions to change (for example, due to changes in the load characteristics and thermal expansion of the bulb 25 and waveguide body 22). The feedback adjusts to changing lamp conditions to sustain oscillation.

In the example embodiment of FIG. 1, the amplifier 24 is unstable in regions of its operation. An unstable amplifier may have higher performance than an amplifier that is stable throughout the full range of operating conditions and load trajectories that can be used by the lamp. While it may be desirable to use amplifiers with some unstable regions, this may cause failure during operation and, in some cases, may cause the amplifier to explode. As described above, the load characteristics of the lamp 20 may change during operation due to ignition of the plasma, thermal expansion and adjustments to the feedback loop. As a result, the amplifier 24 is required to operate across a range of operating conditions and may fail if the operating conditions fall within an unstable region of the amplifier 24. Accordingly, example embodiments provide systems and methods for using amplifiers with unstable regions of operation, while providing for stable operation of an electrodeless plasma lamp.

The plasma lamp 20 of FIG. 1 is an example only and other lamp embodiments may also be utilized, such as those disclosed in co-pending U.S. applications: provisional application Ser. No. 60/730,654, titled "Plasma Lamp Using a Shaped Waveguide Body"; provisional application Ser. No. 60/730,785, titled "Plasma Lamp and Methods Using a Waveguide Body and Protruding Bulb" filed Oct. 27, 2005; provisional application Ser. No. 60/730,950, titled "Plasma Lamp with Compact Waveguide" filed Oct. 27, 2005; provisional application Ser. No. 60/730,953, titled "High Brightness Plasma Lamp" filed Oct. 27, 2005; and provisional application Ser. No. 60/730,786, titled "Plasma Lamp with Phase Control" filed Oct. 27, 2005, each of which is incorporated herein by reference in its entirety.

Figure 2:
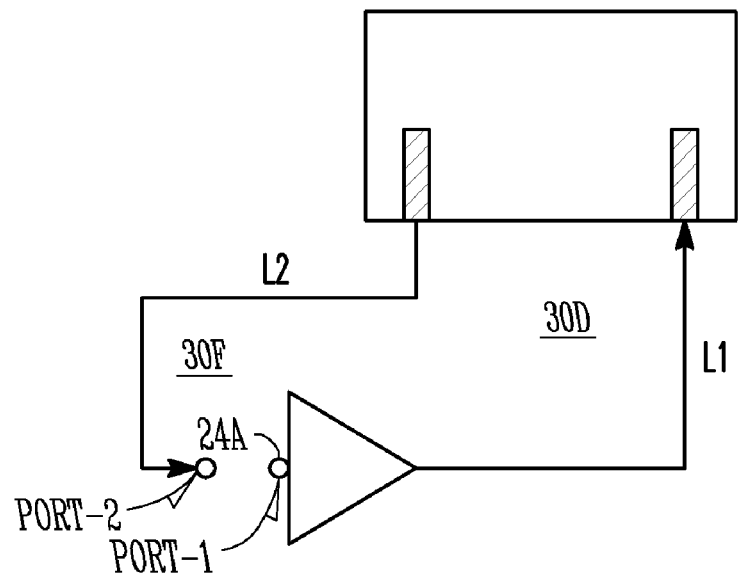
FIG. 2 schematically depicts a positive-feedback loop broken at the amplifier input.

The topology of FIG. 1 is a positive-feedback loop. Positive feedback loops can be used to sustain oscillations at frequencies satisfying two basic conditions. First, the loop's gain, provided by an amplifier, is greater than the total loss in the loop. Secondly, the total phase shift of an electromagnetic wave traversing the loop is such that the wave reproduces itself, and thus, undergoes some N-multiple of $2\pi$ in phase change, so as to constructively form a stationary wave. This concept is illustrated in FIG. 2 which shows the "open-loop" system associated with the "closed-loop" system of FIG. 1. The "feedback loop" 30F is "broken" at an arbitrary point, here amplifier input port 24A. Defining the input of the open-loop system as Port-1 and its output as Port-2, a complex multiplier $S_{21}$ takes a wave from Port-1 to Port-2. $S_{21}$ typically varies as a function of frequency; at any given frequency, the required conditions for resonance are: $|S_{21}|>1$; and angle $(S_{21})=2\pi N$. These two conditions select for a series of possible frequencies. From the loop's perspective, the waveguide body behaves as a lossy narrow band-pass filter; any element in the loop having a band-pass spectral characteristic serves to select a single preferred frequency of oscillation. The cavity selects its resonant frequency to pass from the feedback probe to the drive probe. This signal is then amplified and delivered back into the cavity via the drive probe. Oscillation persists when the net phase shift of the total loop, consisting of feedback loop 30F and "drive loop" 30D, is such that a frequency preferred by the body is also one which constructively forms stationary waves in feedback loop 30F.

Figure 3A:
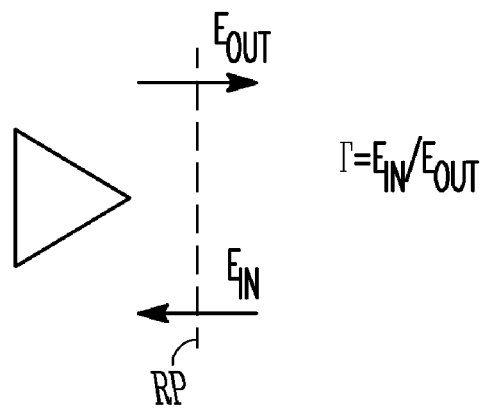
FIG. 3A schematically depicts $\Gamma$, the reflection coefficient.
Figure 3B:
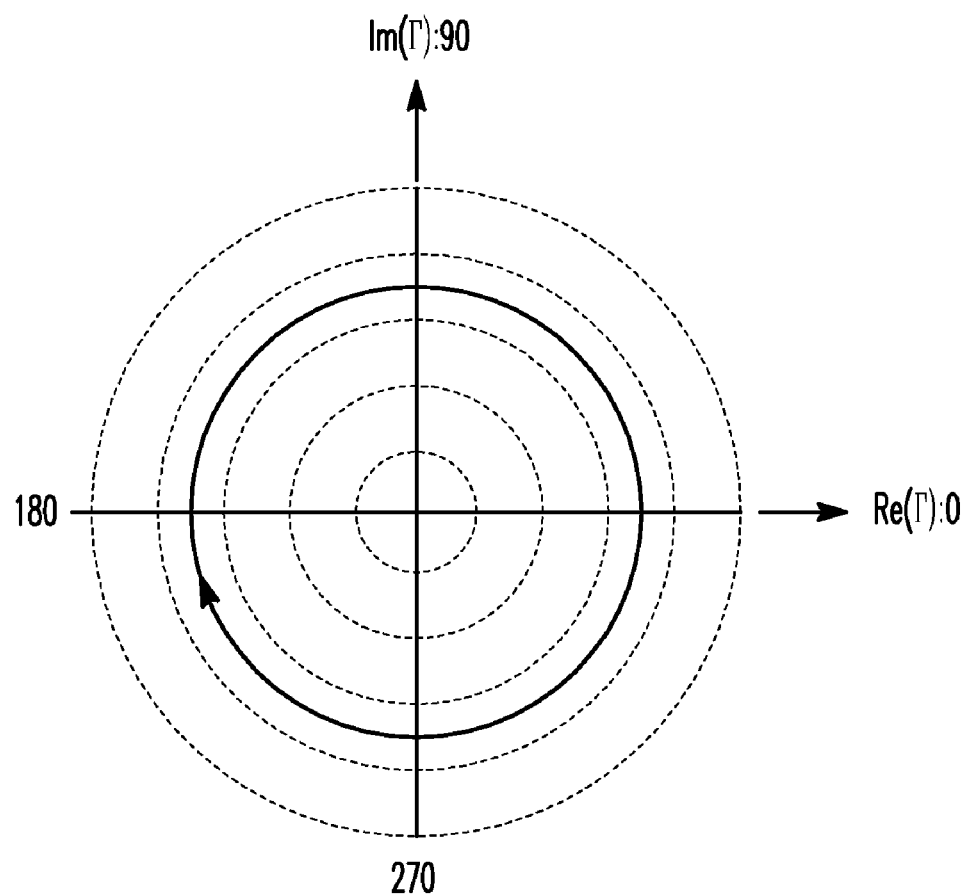
FIG. 3B illustrates a load trajectory polar-plot where $\Gamma$ changes in phase but not in magnitude.
Figure 3C:
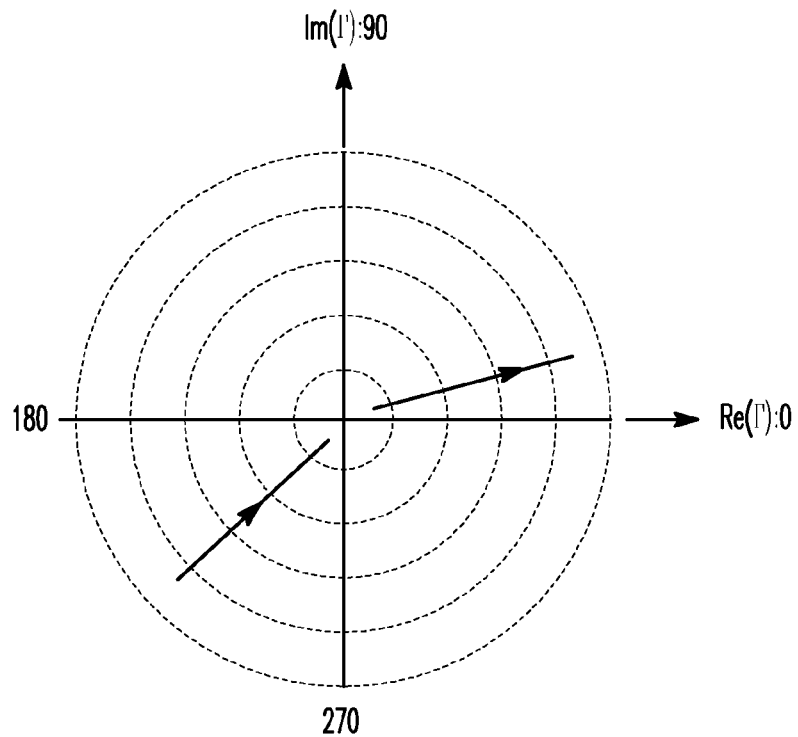
FIG. 3C illustrates a load trajectory polar-plot where $\Gamma$ changes in magnitude but not in phase.

FIG. 3A illustrates the definition of a parameter $\Gamma$, the "reflection coefficient," a measure of the changing load condition over the various phases of lamp operation, particularly the transition from cold gas at start-up to hot plasma at steady state. $\Gamma$, defined with respect to a reference plane "RP" at the amplifier output, is the ratio of the "reflected" electric field $E_{in}$ heading into the amplifier, to the "outgoing" electric field $E_{out}$ traveling out. Being a ratio of fields, $\Gamma$ is a complex number with a magnitude and phase. A useful way to depict changing conditions in a system is to use a "polar-chart" plot of $\Gamma$'s behavior (termed a "load trajectory") on the complex plane. Because $\Gamma$ is generally dispersive, and thus frequency dependent, a polar-plot depicts $\Gamma$ at a particular frequency. As depicted in FIG. 3B, if $\Gamma$ changes in phase but not in magnitude the load trajectory(ies) will be circular. Circuit alterations leading to a circular load trajectory include altering the lengths (and therefore the phase of propagation) of one or both transmission lines (here, cables), and/or altering the reactance (capacitance and/or inductance) of circuit components. Such compensation may be useful for adjusting the starting angle of $\Gamma$. As depicted in FIG. 3C, if $\Gamma$ changes in magnitude but not in phase the load trajectory(ies) will be radial. The magnitude of $E_{in}$ is inversely related to the power coupled from the amplifier to its load. Thus, the lower the magnitude of $\Gamma$ and thus the closer to the origin, the better the load absorbs power from the amplifier. We have observed that the effect of lamp start-up and plasma formation is to trace out mainly radial $\Gamma$'s.

$\Gamma$ may be used to determine amplifier stability. We define two categories of stability behavior: "S"—stable for a $\Gamma$ crossing that region on the polar-chart; and "U"—unstable so that for a $\Gamma$ crossing that region, the amplifier exhibits failure conditions such oscillation and/or catastrophic failure. The stable region of some amplifiers depends upon the bias voltage applied to the amplifier. The regions that require a particular bias voltage in order to be stable are sometimes referred to as "conditionally stable." In example embodiments, these regions are considered stable if the required bias voltage is applied, and unstable if the bias voltage is not applied. In designing an amplifier circuit for a lamp, regions of S and U may first be identified on a polar-chart, overlaying them on the load trajectory to predict circuit behavior.

Figure 4A:
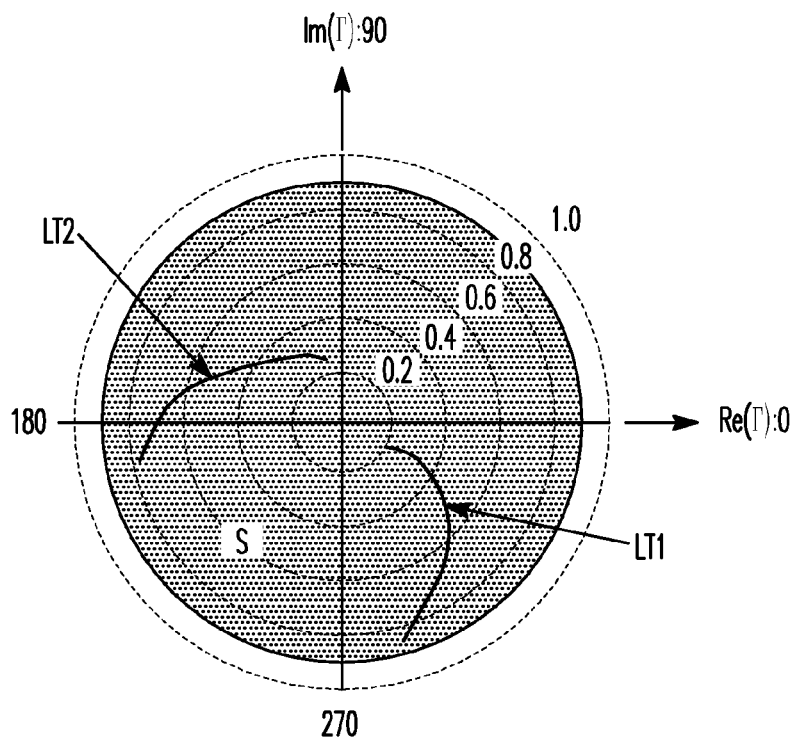
FIG. 4A is a load trajectory polar-plot for an amplifier that is stable over the entire load trajectory of a lamp for any phase.
Figure 4B:
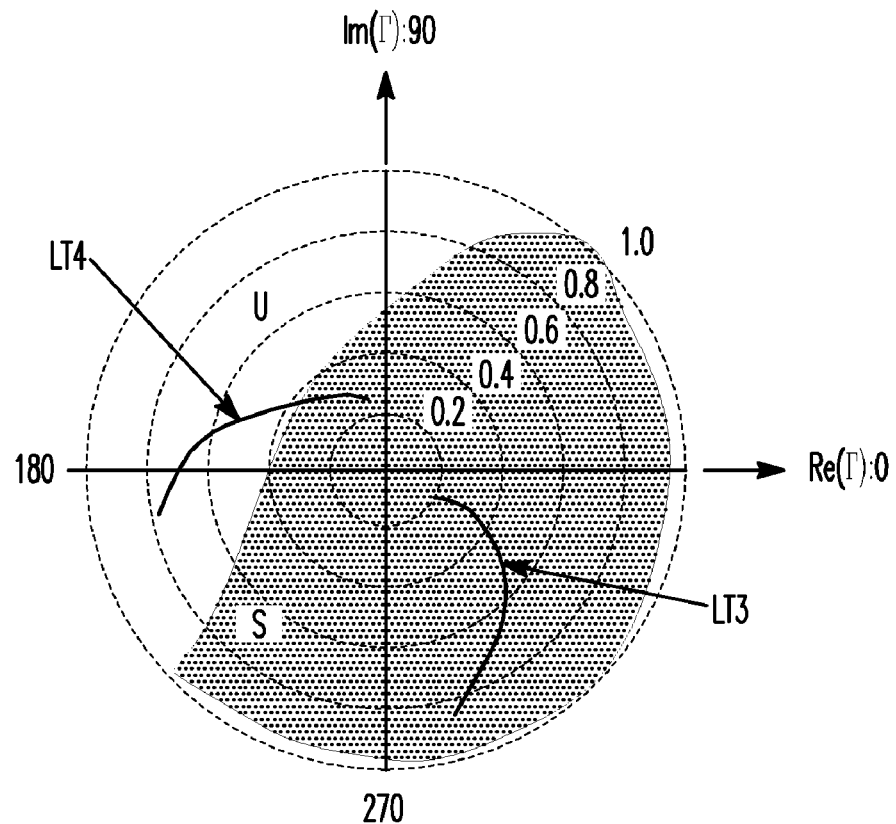
FIG. 4B depicts a load trajectory polar-chart for an example amplifier which has stable and unstable regions of operation.

FIG. 4A is a polar-plot for an amplifier that is stable over load trajectories LT1 and LT2 for any phase. This amplifier would be stable even if connected so that the load trajectories had a different phase. As a result, this amplifier is considered stable across the load trajectories LT1 and LT2 for a lamp, regardless of phase-shifting caused by the feedback circuit or transmission lines connecting the amplifier to the waveguide body. As described above, it may be desirable to use an amplifier that has unstable regions that could be traversed by the load trajectory of a lamp for at least some phases and magnitudes; however, the phase and/or magnitude may be constrained by the design of the feedback circuit in accordance with example embodiments so that, in operation, the load trajectory avoids the unstable regions of the amplifier. FIG. 4B is a polar-plot for an amplifier with limited regions of stability. Load trajectory LT3 would result in acceptable system behavior, while load trajectory LT4 (the same load trajectory at a different phase) would result in system failure.

Unless a suitable amplifier with unconditional stability is used, simultaneously ensuring amplifier stability and feedback loop resonance in a plasma lamp utilizing positive-feedback may require compensation. Example techniques for compensation to provide for stable lamp operation are disclosed herein. These example techniques allow amplifiers with unstable regions of operation to be used with a plasma lamp. In some embodiments, the load trajectory and resonance condition may be independently tuned. This takes advantage of the fact that while $\Gamma$ depends on the characteristics of transmission between the amplifier output and the load (lamp), loop resonance depends on the transmission of the entire loop.

Figure 5A:
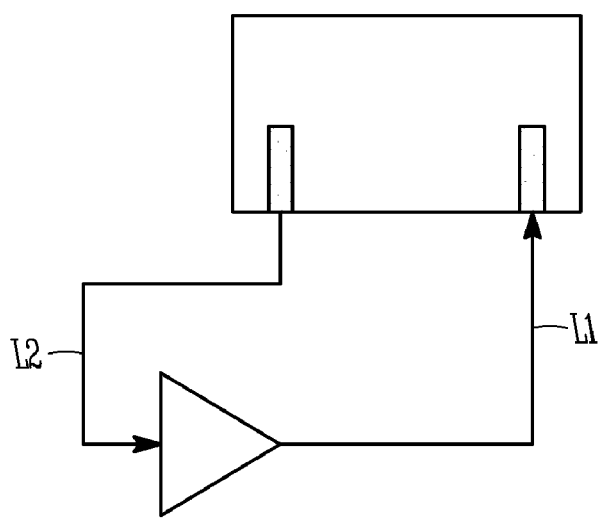
FIG. 5A schematically depicts an example plasma lamp circuit using an amplifier in an unstable configuration.
Figure 5B:
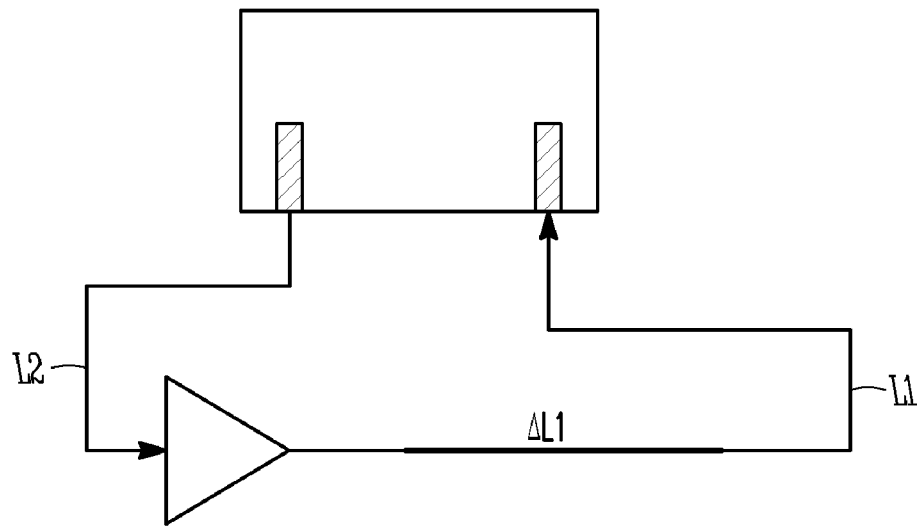
FIG. 5B schematically depicts the FIG. 5A lamp circuit with the cable connecting the amplifier output and drive probe altered in length to provide for stable operation of the amplifier.
Figure 5C:
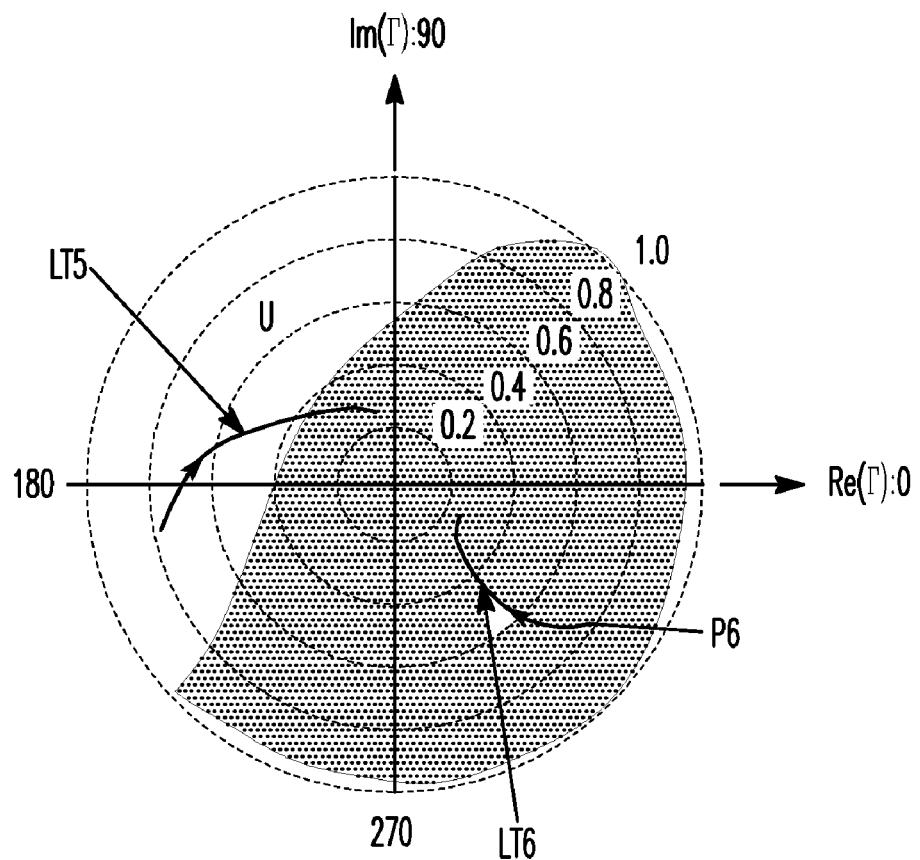
FIG. 5C is a polar-chart overlaying the regions of stability and instability on the load trajectories of the FIGS. 5A and 5B lamp circuits.

One example compensation technique, generically referred to herein as the "loop-tuning length" method, is to choose the length $L_1$ of transmission line L1 connecting the amplifier to the drive probe to tune the phase shift from the amplifier to the drive probe for operation in a stable region of the amplifier. Propagation in a transmission line of an electromagnetic wave with wavelength $\Lambda$ over a distance L introduces a phase shift $\Phi=2\pi(L/\Lambda)$; and while in general the wave amplitude is decreased by conductive loss in the transmission line (typically expressed in units of decibels per meter (dB/m)), for the short length involved in coupling the amplifier to the drive probe, this loss is negligible in example embodiments. Thus, the primary effect of adjusting $L_1$ in example embodiments is to rotate the starting point of the load trajectory along a circle of nearly constant radius on the $\Gamma$-plane. In example embodiments, it has been observed that the primary effect of a lamp starting from a cold state with high reflectivity to a hot state with low reflectivity is to move radially inward on the $\Gamma$-plane, with relatively little phase change. Therefore, once the regions of amplifier stability are known, length $L_1$ can be adjusted to ensure that the $\Gamma$-trace passes only through those regions. This is illustrated by way of example in FIGS. 5A, 5B and 5C. The FIG. 5A system has a load trajectory LT5 (FIG. 5C) causing amplifier instability as the lamp transitions from cold to hot. The compensation technique (FIG. 5B) is to change the length of connecting cable L1 from L1 to $L_1+\Delta L_1$. This rotates the starting point P6 (FIG. 5C) of load trajectory LT6 such that the cold-to-hot load trajectory remains within the stable region S. In example embodiments, the load trajectory is rotated to be well within the stable region. In the event of any deviations during operation, the amplifier will remain stable. For instance, in FIG. 5C the load trajectory LT6 is at least 45° from any unstable region. Thus, for the same magnitudes, the phase could shift by 45° and still remain within a stable region. In other embodiments, the angular distance between the typical load trajectory for the lamp and the unstable region of the amplifier in either direction may be selected to be in the range of 5°-90°, or any range subsumed therein. In some examples, the angular distance may be at least 15°, 30°, 45° or 60° in one direction from the load trajectory to the boundary of the unstable region and may be at least 15°, 30°, 45° or 60° in the other direction. The angular distance in one direction may not be the same as the angular distance in the other direction, and any combination of the above distances may be used in example embodiments. In some example embodiments, the angular distance in each direction for the load trajectory to the unstable region may be the same (essentially centering the load trajectory in the stable region) or be substantially the same (for example, ±5° or ±10° in one direction vis-à-vis the other).

In example embodiments, resonance conditions for the feedback loop are satisfied in the presence of phase shifts associated with tuning for amplifier stability. As the resonance condition depends on the total loop phase shift, the technique is to first adjust length $L_1$ to satisfy amplifier stability, and then adjust the length $L_2$ of transmission line L2 such that the total loop phase shift is a multiple of $2\pi$. In practice, the latter step may be performed by trial and error until good loop resonance is achieved.

A second example compensation technique, generically referred to herein as the "tunable phase-shifter" method is to adjust the phase and/or magnitude using circuit elements. In an example embodiment, an adjustable phase-shifter is used between the amplifier and waveguide body. One example embodiment of a phase-shifter is a passive LC-circuit that is reactive at frequencies of interest. This permits manual tuning of the loop phase. Another example embodiment is an "active" phase-shifter controlled by a controller such as a microprocessor, microcontroller or other control circuit. In some example embodiments, the controller may be external to the phase-shifter. In other example embodiments, the controller may be integrated with the phase-shifter. Active design permits optimization of the loop phase both at lamp start-up and after the lamp reaches steady state. For example, the PS214-315 voltage-controlled phase-shifter commercially available from Skyworks Solutions, Inc. of Woburn, Mass. may be used in some embodiments.

Figure 6A:
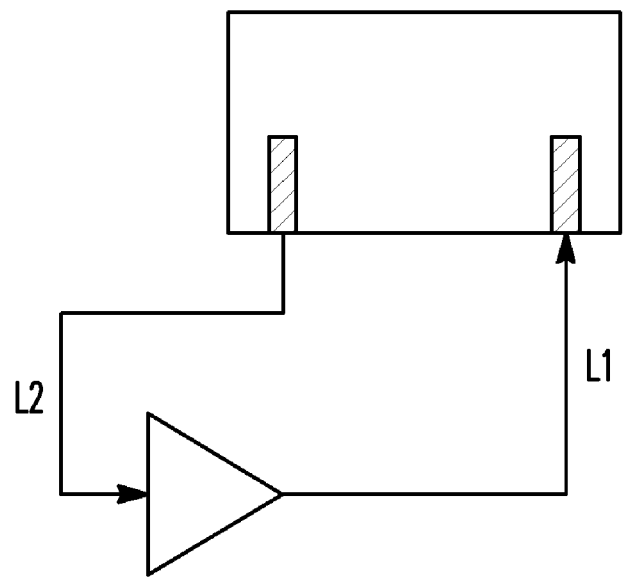
FIG. 6A schematically depicts an example plasma lamp circuit using an amplifier in an unstable configuration.
Figure 6B:
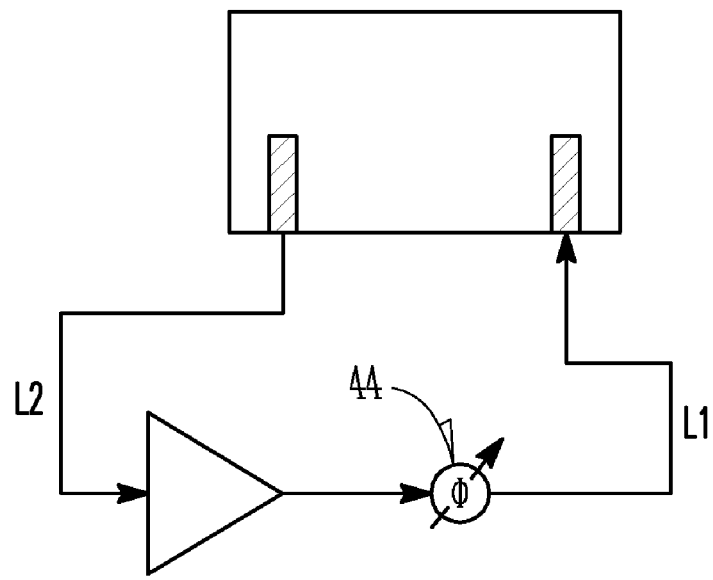
FIG. 6B schematically depicts the FIG. 6A lamp circuit modified by inserting a phase-shifter between the amplifier output and drive probe to provide for stable operation of the amplifier.
Figure 6C:
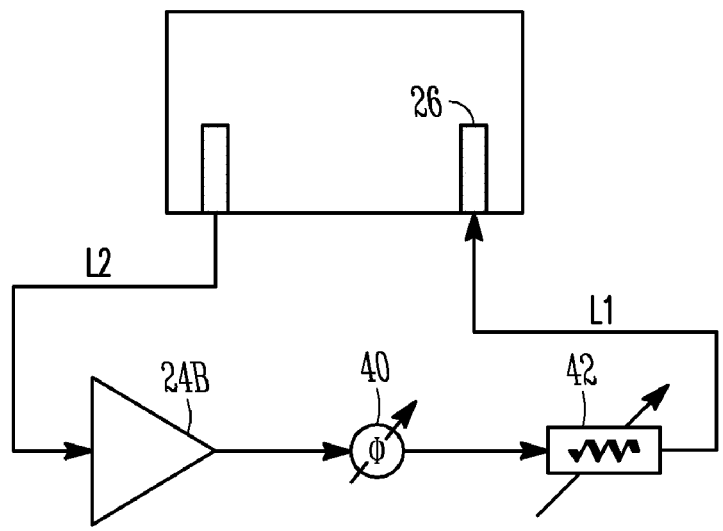
FIG. 6C schematically depicts the FIG. 6A lamp circuit modified by inserting a phase-shifter and an attenuator between the amplifier output and drive probe to provide for stable operation of the amplifier.
Figure 6D:
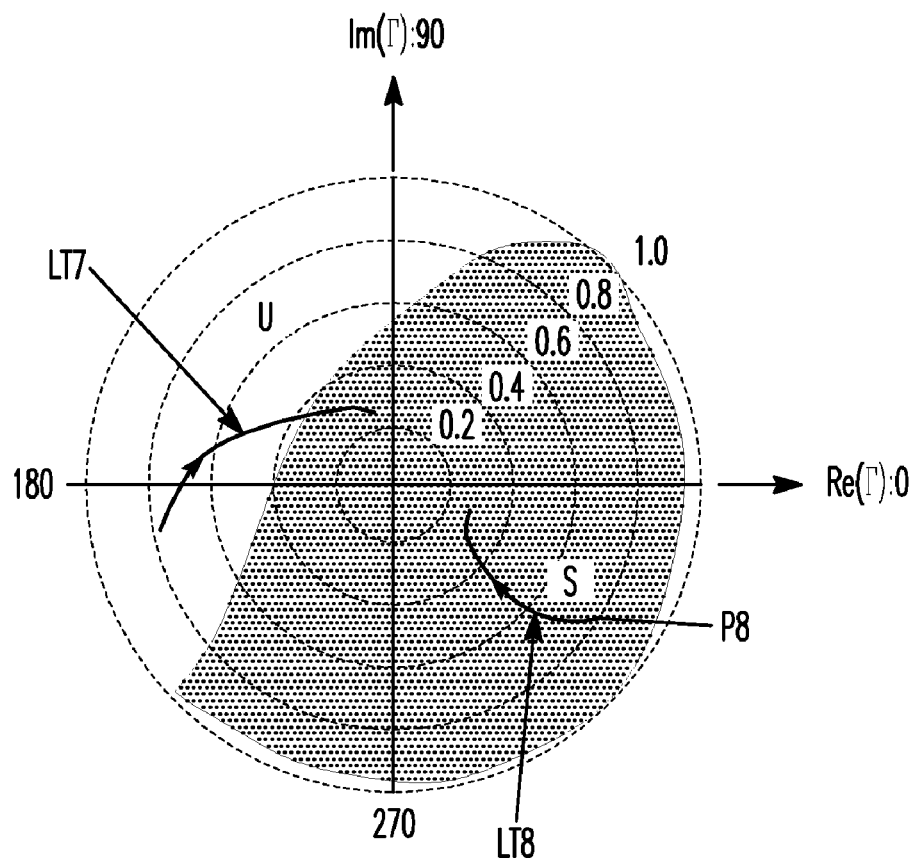
FIG. 6D is a polar-chart overlaying regions of stability and instability on the load trajectories of the FIGS. 6A, 6B and 6C lamp circuits.

An adjustable attenuator, when placed in series with the phase-shifter, permits simultaneous adjustment of the magnitude and phase of the load trajectory's starting point. The latter arrangement is shown in FIG. 6C where a phase-shifter 40 and attenuator 42 are connected between amplifier output port 24B and drive probe 26. As in FIG. 5A, the load trajectory LT7 (FIG. 6D) of the FIG. 6A lamp circuit is almost entirely in the unstable region U. FIG. 6B shows the FIG. 6A lamp circuit modified by inserting a phase-shifter 44 between the amplifier output and drive probe. Phase-shifter 44 is used to rotate the starting point P8 of $\Gamma$ such that load trajectory LT8 remains within the stable region S through lamp start-up. In this example, a variable attenuator is not used, as indicated by the magnitude (radial distance from the origin) of $\Gamma$ remaining unchanged in the load trajectory. FIG. 6D depicts a scenario where phase-shifter 40 or 44 has been adjusted to match the phase shift caused by length $\Delta L1$ (see FIG. 5B) so that the FIGS. 5C and 6D polar-charts match. This is an example only, and other approaches may also be used. Once phase-shifter 40 or 44 is adjusted for amplifier stability, length $L_2$ is adjusted for loop resonance.

As described above, the feedback circuit may be adjusted to position the load trajectory within a stable region of operation for the amplifier. The position may be well within the stable region with angular distance in the range of 5°-90°, or any range subsumed therein, between the load trajectory and the boundary of the unstable region. The feedback circuit may be tuned in example embodiments to position the load trajectory so that the angular distance between the load trajectory and the unstable region is within any of the ranges described above in connection with FIG. 5C.

Figure 7A:
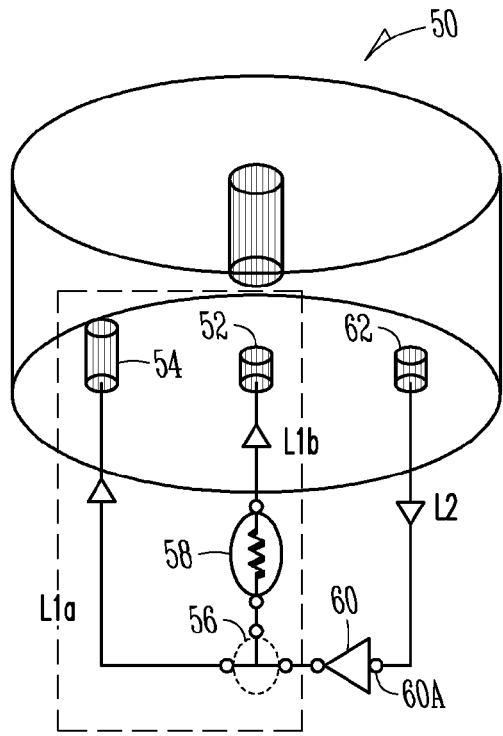
FIG. 7A schematically depicts an example plasma lamp having a cylindrical waveguide body and a drive probe, feedback probe, and start probe. The feedback probe is connected to the drive probe by an amplifier and a splitter, and connected to the start probe by the amplifier, splitter, and a phase-shifter.
Figure 7B:
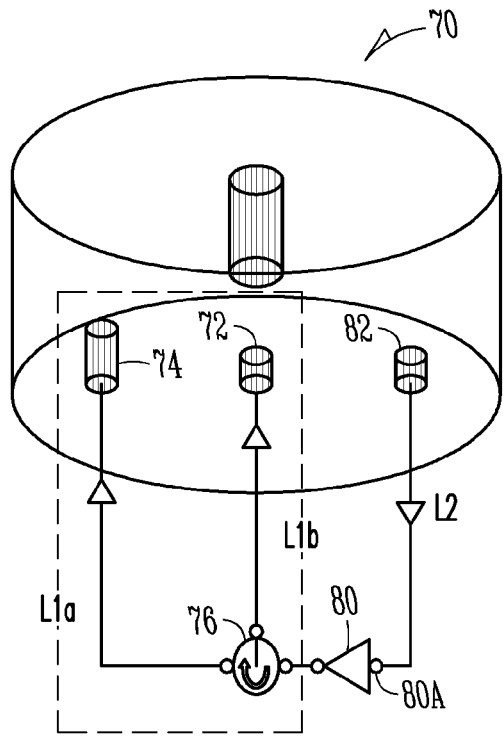
FIG. 7B schematically depicts an example plasma lamp having a cylindrical body and a drive probe, feedback probe, and start probe. The feedback probe is connected to the drive probe and start probe by an amplifier and a circulator.

FIGS. 7A and 7B schematically depict example three-probe plasma lamps 50, 70, respectively, having the common feature of a start probe 52, 72, respectively, and a drive probe 54, 74, respectively, differing in their degree of coupling to the single resonant mode used in lamp operation. The start probe may be positioned such that it couples efficiently while the bulb gas-fill is cold, and the drive probe may be positioned such that it couples efficiently when the plasma is at its steady state operating temperature. Lamp 50 includes a splitter 56 and phase-shifter 58; as the temperature changes, power is delivered to the probe offering the lower impedance. Lamp 70 includes an RF circulator 76 such that power reflected from start probe 72 is shunted to drive probe 74 during steady state operation. In order to discuss the appropriateness and effectiveness of the two compensation methods and their several techniques disclosed above, lamps 50 and 70 are assumed to have identical transmission lines: L1$a$, which in lamp 50 connects splitter 56 to drive probe 54, and in lamp 70 connects circulator 76 to drive probe 74; L1$b$, which in lamp 50 connects phase-shifter 58 to start probe 52, and in lamp 70 connects circulator 76 to start probe 72; and L2, which in lamp 50 connects input port 60A of amplifier 60 to feedback probe 62, and in lamp 70 connects input port 80A of amplifier 80 to feedback probe 82. In this example, amplifier 80 has unstable regions of operation.

For both lamps, $\Gamma$, calculated at the amplifier's output port, depends in a reactive way (the load trajectory is a circular trace on the polar-plot) although, unlike the FIGS. 5A-C and FIGS. 6A-C lamps there are now two degrees of freedom because the length of L1$a$ and/or L1$b$ can be changed. Given the amplifier's stability map, either or both lengths L1$a$, L1$b$ can be adjusted so as to rotate the starting point of $\Gamma$ such that a cold-to-hot load trajectory remains within the stable region. The feedback circuit may be tuned in example embodiments to position the load trajectory so the angular distance between the load trajectory and the unstable region is within any of the ranges described above in connection with FIG. 5C.

The tunable phase-shifter method is applicable to the FIGS. 7A and 7B lamps. A phase-shifter, or a phase-shifter and an attenuator, can be inserted into either line L1$a$ or L1$b$; a phase-shifter is not required to be inserted in both lines in this embodiment. In the FIG. 7A lamp, a phase-shifter and attenuator are already present. Finally, transmission line L2 may be independently tuned so as to achieve a resonance condition in the feedback loop. The feedback circuit may be tuned in example embodiments to position the load trajectory so the angular distance between the load trajectory and the unstable region is within any of the ranges described above in connection with FIG. 5C.

Figure 8A:
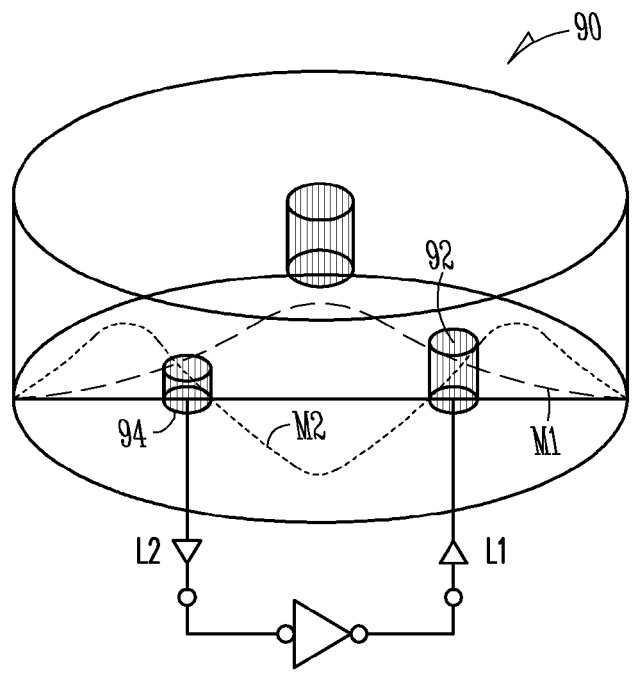
FIG. 8A schematically depicts an example plasma lamp having a cylindrical body and a drive probe and feedback probe connected by an amplifier. A start resonant mode is used before plasma formation, and a drive resonant mode is used to power the plasma to steady state.
Figure 8B:
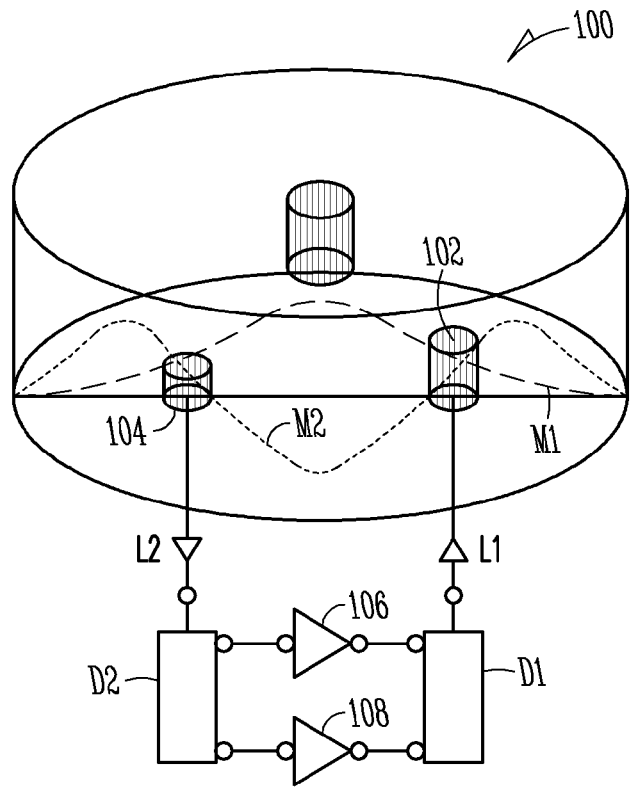
FIG. 8B schematically depicts an example plasma lamp having a cylindrical body and a drive probe and feedback probe connected by first and second amplifiers and first and second diplexers.

FIGS. 8A and 8B schematically depict two-probe plasma lamps 90, 100, respectively, having the common feature of utilizing two resonant modes: a "drive" mode M1 at the frequency of the cavity fundamental mode; and a "start" mode M2 at the frequency of a cavity higher order mode. Using two cavity modes, it is possible to design a drive probe that is critically coupled both before plasma formation and after the plasma reaches steady state. Drive probe 92, 102, respectively, and feedback probe 94, 104, respectively, are positioned so as to couple to both modes. Lamp 100 includes two amplifiers 106, 108, either or both of which may have unstable regions of operation in example embodiments. The two amplifiers independently power, respectively, the drive and start modes. Diplexer D1 combines the two frequencies going into drive probe 102, and a second diplexer D2 separates the two frequencies coming out of feedback probe 104.

Because the reflection coefficient $\Gamma$ is frequency dependent and orthogonality is a fundamental property of the resonant modes, $\Gamma_1$ calculated for the drive mode is independent of $\Gamma_2$ calculated for the start mode. All of the techniques of the loop-tuning length and tunable phase-shifter methods are potentially applicable, but in this example are implemented one frequency at a time. In this example, the general method is to first map the S and U regions for the amplifier(s) at both the start and drive frequencies, and then separately apply a compensation technique tailored to each frequency. While the techniques apply separately to each frequency, they do not necessarily apply independently. For example, in lamp 90 the single amplifier 96 needs to be configures such that it is stable for both frequencies. If the L1 compensation technique is used, $L_1$ is adjusted such that the load trajectory traverses the S region for both frequencies. If a phase-shifter is used, it may operate at both frequencies in example embodiments, and the phase shift is adjusted so that the load trajectory only traverses S regions for both frequencies. The presence of two loops, the L2-amplifier 106-L1-probes/bulb loop for $\Gamma_1$ and the L2-amplifier 108-L1-probes/bulb loop for $\Gamma_2$, means that the loop phase shifts can be adjusted independently. The feedback circuit may be tuned in example embodiments to position the load trajectory so the angular distance between the load trajectory and the unstable region is within any of the ranges described above in connection with FIG. 5C.

FIGS. 9A and 9B schematically depict example three-probe lamps 120, 130, respectively, which use a cavity higher order mode M4 before plasma formation, and the cavity fundamental mode M3 to power the plasma to reach and maintain a steady state. Lamp 120 has drive, feedback and start probes 122, 124, 126, respectively, and a single amplifier A1 connected to a diplexer D3, which may have unstable regions of operation in this example embodiment. Lamp 130 has drive, feedback and start probes 132, 134, 136, respectively, and separate amplifiers A2, A3, either or both of which may have unstable regions of operation in this example embodiment, connected in parallel to a diplexer D4, which power, respectively, the drive and start modes. The configurations of lamps 120, 130 are "cleaner" than those of lamps 90, 100 because compensation techniques can be applied both separately and independently for each frequency. For lamp 120, $\Gamma_1$ corresponds to the loop L2-A1-L1a-drive probe 122-bulb B1-L2 feedback at the drive mode frequency, and may be adjusted by independently varying L1a or inserting a phase-shifter, or a phase-shifter and attenuator, in line L1a. $\Gamma_2$ corresponds to the loop L2-A1-L1b-start probe 126-L2 feedback at the start mode frequency, and may be independently adjusted by varying $L_{1b}$ or inserting a phase-shifter, or a phase-shifter and attenuator, in line L1b. For lamp 130, $\Gamma_1$ corresponds to the loop L2-A2-L1a-drive probe 132-bulb B2-L2 feedback at the drive mode frequency, and may be adjusted by independently varying $L_{1a}$ or inserting a phase-shifter, or a phase-shifter and attenuator, in line L1a. $\Gamma_2$ corresponds to the loop L2-A3-L1b-start probe 136-L2 feedback at the start mode frequency, and is independently adjusted by varying $L_{150b}$ or inserting a phase-shifter, or a phase-shifter and attenuator, in line L1b. In this example, the general method may be to map the S and U regions for the amplifier(s) at the drive and start frequencies, and then separately apply a compensation technique to each frequency to ensure that the $\Gamma1$ and $\Gamma2$ load trajectories traverse S regions. The feedback circuit may be tuned in example embodiments to position the load trajectory so the angular distance between the load trajectory and the unstable region is within any of the ranges described above in connection with FIG. 5C.

FIG. 10A is a side view of a lamp 1000 according to an example embodiment. The lamp 1000 may be connected to a control and feedback circuit of the type shown in FIG. 6B or 6C. The amplifier may have unstable regions of operation, but the phase and magnitude are selected so that the amplifier remains in a stable region during operation of the lamp. The lamp has a connector 1002A to the drive probe that may be connected to the output of the amplifier and a connector 1002B to the feedback probe that may be connected to the input of the amplifier through the active phase shifter (or the phase shifter may be located at the output of the amplifier). Power is coupled into the waveguide body 1004 to ignite a plasma in the bulb 1006. As shown in FIG. 10A, the bulb 1006 may protrude from the front surface 1008 of the waveguide 1004 which reduces the electric field intensity at the end of the bulb.

Figure 10B:
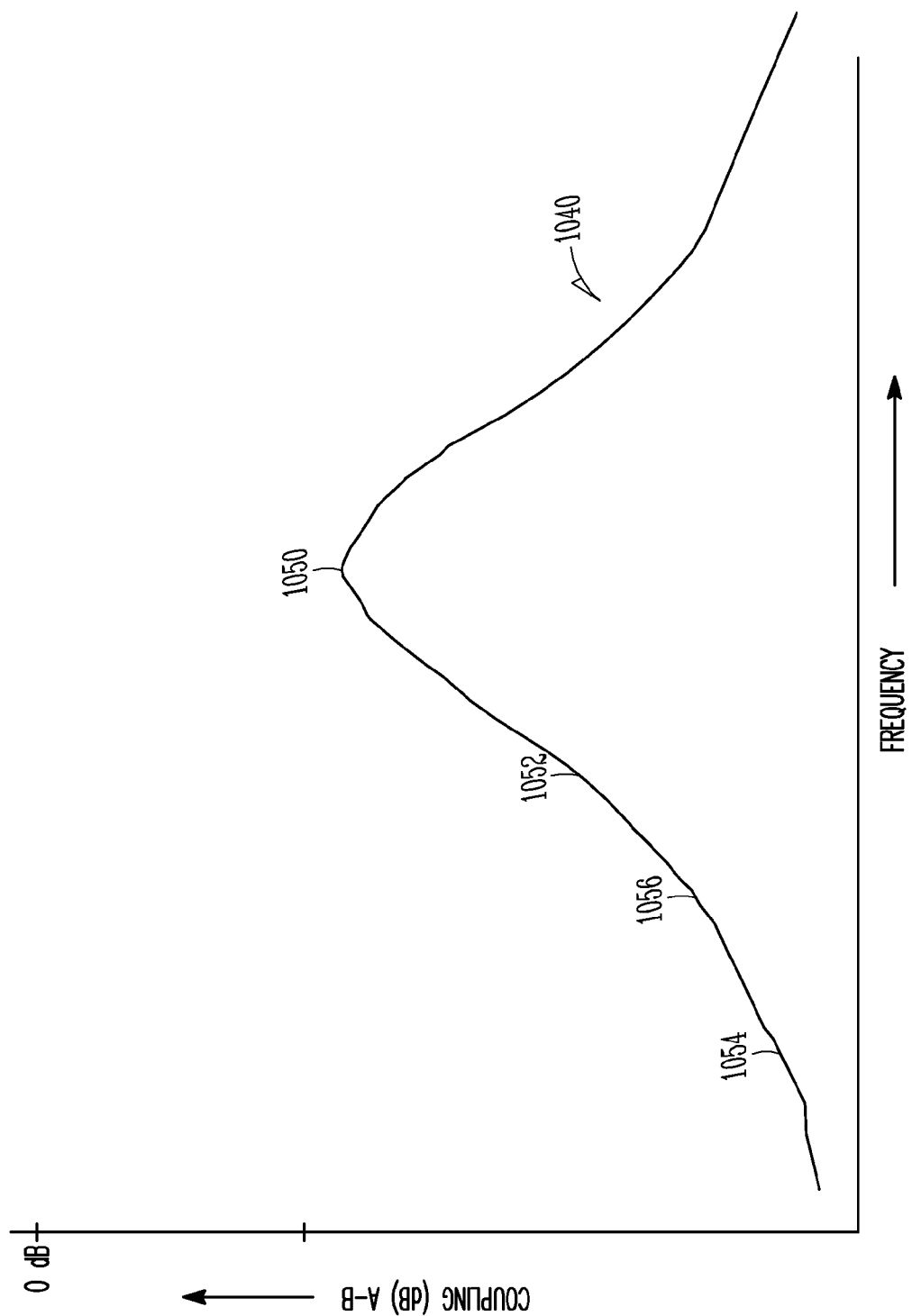
FIG. 10B is a chart illustrating coupling between a port for a drive probe and a port for a feedback probe for the lamp of FIG. 10A as a function of frequency during periods of lamp operation from ignition to steady state.

An example ignition and startup sequence for lamp 1000 will now be described. FIG. 10B is a chart showing power coupling from input connector 1002A to feedback connector 1002B as a function of frequency. The curve 1040 is an approximation of the frequency response for the lamp 1000 in its cold state when the plasma in the bulb 1006 is not ignited. However, as the plasma ignites, the center frequency, peak amplitude, and width of the resonance all shift due to changing impedance of the plasma. The positive feedback loop automatically oscillates at a frequency based on the load conditions and phase of the feedback signal. If the phase is such that constructive interference occurs for waves of a particular frequency circulating through the loop, and if the total response of the loop (including the amplifier, the lamp, and all connecting elements) at that frequency is such that the wave is amplified rather than attenuated in a loop-traversal, then the loop will oscillate that frequency. Because, in the absence of a phase-shifter, the phase of a wave circulating back to the same point in a loop depends on the ratio of its wavelength (frequency) to the physical length of the loop (as well as the dielectric constants of all intervening material), whether a particular setting of the phase shifter induces constructive or destructive feedback is itself a function of frequency. In this way, the phase shifter is used to finely-tune the actual frequency of oscillation within the range supported by the lamp's resonant frequency response. In doing so, it also in effect tunes how well power is coupled into the lamp, whose absorption of the incoming RF power is itself a function of frequency. Thus the phase shifter provides a control with which the startup sequence may be optimized, as will be described.

Figure 10C:
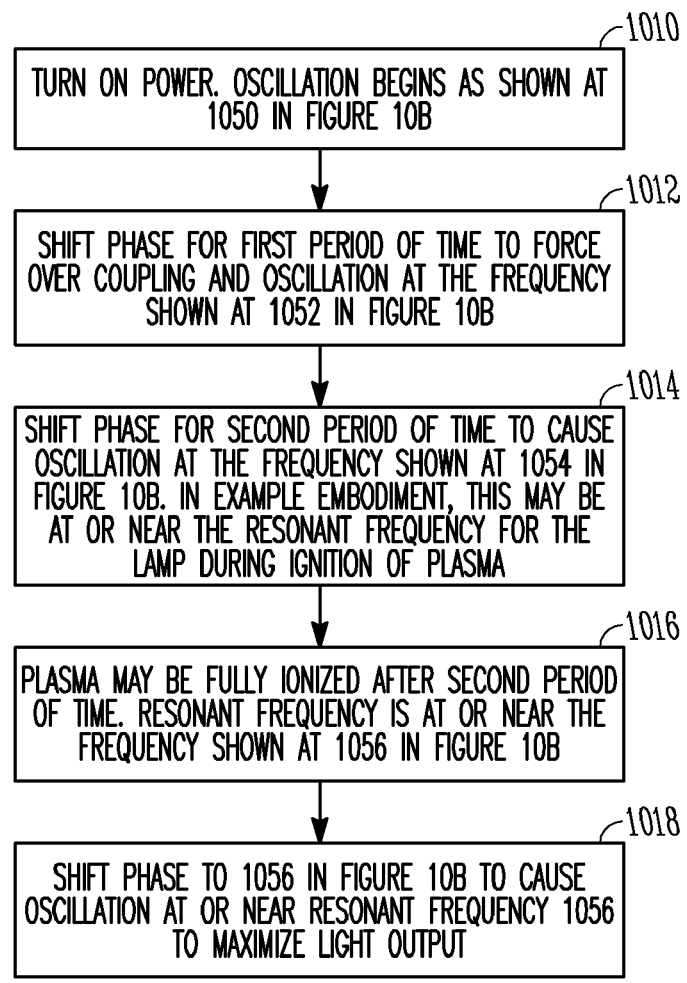
FIG. 10C is a flow chart of a method for operating a lamp according to an example embodiment.

FIG. 10C is a flow chart of a method for operating a lamp 1000 according to an example embodiment. Referring to FIG. 10C, the lamp may be turned on at step 1010. At step 1010, the lamp is in a cold state and the plasma is not ignited. Oscillation begins at the frequency shown at 1050 in FIG. 10B. As the load conditions of the lamp change, the feedback loop automatically adjusts the frequency and selects a frequency of oscillation based on the resonant frequency for the load conditions and the phase of the feedback signal. In order to spike the power to expedite initial ignition of the plasma in the bulb, the microcontroller causes the phase shifter to adjust the phase to over couple the power as shown at step 1012 in FIG. 10C. This forces oscillation at 1052, although this is not the resonant frequency during ignition of the plasma. The "natural" oscillation would occur at the resonant frequency 1054 during ignition, but the selected phase causes destructive interference at 1054 and constructive interference at 1052. While reference is made to phases selected to cause oscillation at particular frequencies, it will be understood that the microcontroller and phase shifter control the phase in this example embodiment and not specific frequencies. The feedback loop automatically selects a frequency based on load conditions and phase. The feedback loop may dynamically adjust frequency throughout the ignition/startup process based on these conditions, although the selected phase can shift oscillation relative to the frequencies that would otherwise occur as the load conditions change during ignition.

This state causes a high power level to be applied to the bulb for a short period of time. The phase may be maintained for a first period of time. In an example embodiment, the first period is predetermined and controlled by the microprocessor and may be in the range of, for example, 50 ms to 1 second or any range subsumed therein. In an example embodiment, the first period may be 100 ms. In some embodiments, this state may cause the power level of the amplifier to exceed the continuous wave (CW) power rating of the amplifier for a short period of time. For example, an amplifier with a CW power rating of 75 watts, 100 watts or 150 watts may be used in various embodiments and the power provided by the amplifier may exceed this level during step 1012 (by up to, for example 10%-80% more than the CW power rating, or any range subsumed therein). The power may then be lowered to a power level at or below the CW power rating in step 1014 as described below. The load impedance of the lamp in this state is not well matched to the ideal load specified for the amplifier (which may be, for example, 50 ohms in some example embodiments). This state may be stressful on the amplifier in some example embodiments and may be maintained for a short period of time. In some example embodiments, the first period of time may be selected to be less than the time specified for the pulsed power rating of the amplifier. This configuration is an example only and other configurations may be used to provide power during step 1012.

After the power is spiked during the first period of time, the microcontroller causes the phase shifter to adjust the phase for a second period of time as shown at step 1014. This causes oscillation at the frequency shown at 1054 in FIG. 10C which is at or near the resonant frequency during ignition. As described above, while reference is made to particular frequencies, it will be understood that the feedback loop may dynamically adjust frequency throughout this process. The impedance matching between the lamp and the amplifier is better than during step 1012, but still may not be very good. As the plasma becomes fully vaporized, the resonant frequency may shift to 1056 in FIG. 10B, but the phase is not adjusted for oscillation at this frequency. The second period of time may be predetermined by the microcontroller and, in example embodiments, may be between 5 and 20 seconds or any range subsumed therein. In a particular example, the second period of time is 9.9 seconds (e.g., 10 seconds less the amount of time used for step 1012).

After the second period of time, the plasma may be fully ionized as shown at step 1016 and the resonant frequency for steady state operation of the lamp may be at or near 1056. As shown at step 1018, the microcontroller may cause the phase shifter to shift the phase to oscillate at the resonant frequency 1056 to maximize light output.

The above method is an example only and other variations may be used in some example embodiments. For example, instead of using predetermined periods of time set by a microcontroller or other control circuit, lamp conditions (such as brightness from sensor S in FIG. 26, the signal from the feedback probe, a measurement of reflected power at the drive probe or other operating condition of the lamp) may be used to determine when and how to shift the phase in some example embodiments. In other example embodiments, the microcontroller may step through less than four phases (for example two phases—an ignition phase and a phase for steady state operation when the plasma is ionized) or more than four phases (for example a range of phases at various frequencies as the resonant frequency changes during ignition and startup). The phase used to achieve desired lamp operating conditions during initial ignition, startup and steady state operation may be determined empirically in example embodiments and/or through simulation/modeling and/or by signals derived from lamp operating conditions monitored by the microprocessor. In other example embodiments, the phase selected for steady state operation may be slightly out of resonance, so maximum brightness is not achieved. This may be used to leave room for the brightness to be increased and/or decreased in response to brightness control signals.

Figure 10D:
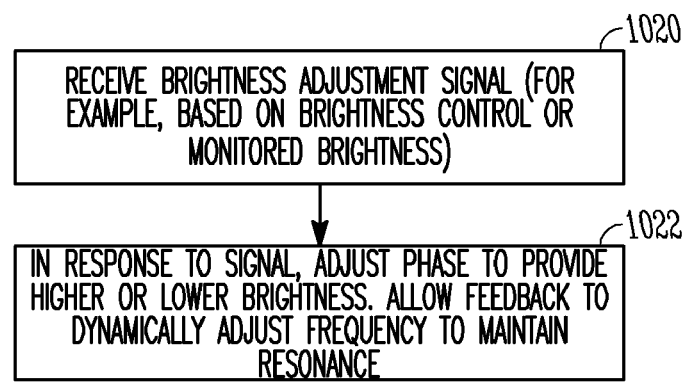
FIG. 10D is a flow chart of a method for brightness adjustment according to an example embodiment.

FIG. 10D is a flow chart of a method for brightness adjustment according to an example embodiment. This example method may be used in connection with a control and feedback circuit of the type shown in FIG. 26. As shown at 1020, the microprocessor may receive a signal indicating the brightness of the lamp should be adjusted. This signal may be generated by a sensor S that samples the light from the bulb B. The signal may also be provided by a brightness control or based on timers or other triggers in the lamp. As shown at 1022, the microcontroller then causes the phase shifter PS4 to adjust the phase. In an example embodiment, phase shifting may be used to increase or decrease the brightness.

With either the ignition sequences or brightness adjustments described above, the load trajectory is modified. For example, the phase shifts used to spike power for ignition cause the load trajectory to have more circular and radial motion on the polar chart. If the phase is not controlled correctly, this may cause the load trajectory to cross an unstable region of the amplifier. For instance, the phase shifts used for ignition or brightness adjustment may cause a circular movement of from 0 to 180 degrees or any range subsumed therein. The load trajectory may otherwise be a large angular distance from any unstable region (e.g., from 10 to 180 degrees or any range subsumed therein). The phase shift for ignition or brightness adjustment may cause the load trajectory to come much closer to the unstable region (e.g., from 0 to 180 degrees closer or any range subsumed therein). In example embodiments, the position of the load trajectory on the polar chart relative to the unstable region and the amount of phase shifting used for ignition and brightness adjustment are selected so that the load trajectory remains in the stable region for the amplifier. The use of unstable amplifiers in combination with active phase shifting for ignition, transition to steady state and brightness adjustment may require careful adjustment of the transmission line length, phase adjustment and/or attenuation as described above to ensure stable operation of the amplifier during operation of the lamp.

What is claimed is:
1. A plasma lamp comprising:
a lamp body and a bulb;
an amplifier having an output coupled to the lamp body to provide power to the lamp body;

the lamp body and the bulb having a load trajectory from start-up to steady state operation;

the amplifier having an unstable region of operation, wherein a phase exists such that the load trajectory would cross the unstable region of operation; and at least one transmission line between the amplifier and the lamp body, wherein the transmission line is selected such that the load trajectory does not cross the unstable region of the amplifier.

2. The lamp body of claim 1, wherein the transmission line is selected such that the load trajectory is at least thirty degrees from the unstable region of operation of the amplifier in each direction.

3. The lamp body of claim 1, wherein the transmission line is selected such that the load trajectory is at least ninety degrees from the unstable region of operation of the amplifier in each direction.

4. The lamp body of claim 1 further comprising an input of the amplifier coupled to the lamp body for obtaining feedback from the lamp body and a phase shifter coupled to the amplifier, wherein the phase shifter is configured to adjust the phase of the feedback during ignition of the lamp.

5. The lamp of claim 4, wherein the transmission line is selected such that the portions of the load trajectory other than the adjustment of phase during ignition are at least thirty degrees from the unstable region of operation of the amplifier in each direction.

6. The lamp of claim 5, wherein the load trajectory during the adjustment of phase during ignition is at least 15 degrees closer to the unstable region than the load trajectory during steady state operation.

7. The lamp of claim 5, wherein the load trajectory during the adjustment of phase during ignition is at least 30 degrees closer to the unstable region than the load trajectory during steady state operation.

8. The lamp of claim 4, wherein the load trajectory during the adjustment of phase during ignition is at least 15 degrees closer to the unstable region than the load trajectory during steady state operation.

9. The lamp of claim 4, wherein the load trajectory during the adjustment of phase during ignition is at least 30 degrees closer to the unstable region than the load trajectory during steady state operation.

10. The lamp of claim 4, wherein the phase shifter is configured to adjust brightness during steady state operation by adjusting the phase, and wherein the adjustment of the phase is selected such that the load trajectory remains in the stable region of operation of the amplifier.

11. A plasma lamp comprising:
a lamp body and a bulb;
an amplifier having an output coupled to the lamp body to provide power to the lamp body;
the lamp body and the bulb having a load trajectory from start-up to steady state operation;
the amplifier having an unstable region of operation, wherein a phase exists such that the load trajectory would cross the unstable region of operation; and
at least one phase-shifter between the amplifier and the lamp body, wherein the phase-shifter is configured such that the load trajectory does not cross the unstable region of the amplifier.

12. The lamp of claim 11, wherein the phase shifter is configured to maintain the load trajectory at least thirty degrees away from the unstable region of operation of the amplifier in each direction.

13. The lamp of claim 11, wherein the phase shifter is configured to maintain the load trajectory at least forty five degrees away from the unstable region of operation of the amplifier in each direction.

14. The lamp of claim 11, wherein the phase shifter is configured to adjust the phase during ignition, wherein the load trajectory during the adjustment of the phase during ignition is at least thirty degrees closer to the unstable region than the load trajectory during steady state operation.

15. The lamp of claim 11, wherein the phase shifter is configured to adjust the phase during ignition, wherein the load trajectory during the adjustment of the phase during ignition is at least fifteen degrees closer to the unstable region than the load trajectory during steady state operation.

16. The lamp of claim 11, wherein the phase shifter is configured to adjust brightness during steady state operation by adjusting the phase, and wherein the adjustment of the phase is selected such that the load trajectory remains in the stable region of operation of the amplifier.

17. A plasma lamp comprising:
a waveguide body comprising dielectric material having a dielectric constant greater than about 2;
a bulb adjacent to the body;
first and second probes positioned within the body;
an amplifier having an input port and an output port, the output port connected by a first transmission line to the first probe, the input port connected by a second transmission line to the second probe;
the amplifier having at least one unstable region of operation; and
means for ensuring amplifier stability under all operating conditions of the lamp.

18. The plasma lamp of claim 17 further comprising means for critically coupling the amplifier to the first probe after the plasma reaches steady state operation.

19. The plasma lamp of claim 18, wherein the means for critically coupling the amplifier to the first probe comprises a phase shifter.

20. The plasma lamp of claim 19, wherein the means for ensuring amplifier stability comprises the phase shifter.

21. The plasma lamp of claim 17, wherein the means for ensuring amplifier stability comprises a phase shifter.

22. The plasma lamp of claim 17, wherein the means for ensuring amplifier stability comprises the first transmission line and the second transmission line.

23. The plasma lamp of claim 17, wherein the waveguide body is configured to resonate at a first frequency during ignition and a second frequency during steady state operation.

24. A method of generating light comprising:
providing a lamp body and a bulb, wherein the lamp body and the bulb having a load trajectory from start-up to steady state operation;
coupling power to the lamp body from an amplifier using feedback from the lamp body, wherein a phase exists such that the load trajectory would cross the unstable region of operation; and
adjusting the phase of the feedback such that the load trajectory does not cross the unstable region of the amplifier.

25. The method of claim 24, wherein the lamp body provides a waveguide for coupling the power to the bulb and the waveguide has an effective dielectric constant greater than 2.

* * * * *

UNITED STATES PATENT AND TRADEMARK OFFICE
CERTIFICATE OF CORRECTION

PATENT NO. : 7,638,951 B2  Page 1 of 1
APPLICATION NO. : 11/553881
DATED : December 29, 2009
INVENTOR(S) : DeVincentis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 558 days.

Signed and Sealed this

Twenty-first Day of December, 2010

David J. Kappos
*Director of the United States Patent and Trademark Office*